United States Patent [19]

Blue et al.

[11] 4,413,316
[45] Nov. 1, 1983

[54] DATA PROCESSING SYSTEM FOR PRE-PLANNING THE FLIGHT OF AN AIRCRAFT

[75] Inventors: William Blue, Balerno; George I. C. Bruce; Stephen E. Cowles, both of Edinburgh, all of Scotland

[73] Assignee: Ferranti plc, Cheadle, England

[21] Appl. No.: 179,809

[22] Filed: Aug. 20, 1980

Related U.S. Application Data

[63] Continuation of Ser. No. 31,670, Apr. 19, 1979, abandoned, which is a continuation of Ser. No. 878,796, Feb. 17, 1978, abandoned.

[30] Foreign Application Priority Data

Feb. 21, 1977 [GB] United Kingdom ............... 7279/77

[51] Int. Cl.³ .......................... G06F 3/00; G06F 3/12
[52] U.S. Cl. .................................................. 364/200
[58] Field of Search ... 364/200 MS File, 900 MS File, 364/444, 443

[56] References Cited

U.S. PATENT DOCUMENTS

| | | | |
|---|---|---|---|
| 3,177,348 | 4/1965 | Daniloff | 364/444 |
| 3,534,367 | 10/1970 | Laughlin et al. | 364/439 |
| 3,652,836 | 3/1972 | Richardson et al. | 364/457 |
| 3,771,463 | 11/1973 | Bond | 364/444 |
| 3,845,289 | 10/1974 | French | 364/444 X |
| 3,925,641 | 12/1975 | Kashio | 364/436 |
| 3,979,057 | 9/1976 | Katz et al. | 364/443 X |
| 4,009,375 | 2/1977 | White et al. | 364/431 |
| 4,084,241 | 4/1978 | Tsumura | 364/460 |
| 4,086,632 | 4/1978 | Lions | 364/444 |
| 4,139,889 | 2/1979 | Ingels | 364/460 |

OTHER PUBLICATIONS

*Basic Principles of Digital Computers,* Robinson, Prentice-Hall, 1974, pp. 23–42, 271–298 and 299–317.
*Computer System Architecture,* Mano, Prentice-Hall, 1976, pp. 400–442.

*Primary Examiner*—Harvey E. Springborn
*Attorney, Agent, or Firm*—Kerkam, Stowell, Kondracki & Clarke

[57] ABSTRACT

A data processing system for pre-planning the flight of an aircraft includes a plotting board arranged to supply position coordinates of selected points on a route to a processor. Other inputs to the processor provide details of known aircraft parameters such as speed, fuel load, fuel consumption and bank angle. The processor determines from these inputs for each leg of the flight variable factors such as track heading, flight time, fuel used and fuel remaining. The inputs and outputs of the processor are recorded on a suitable medium.

7 Claims, 2 Drawing Figures

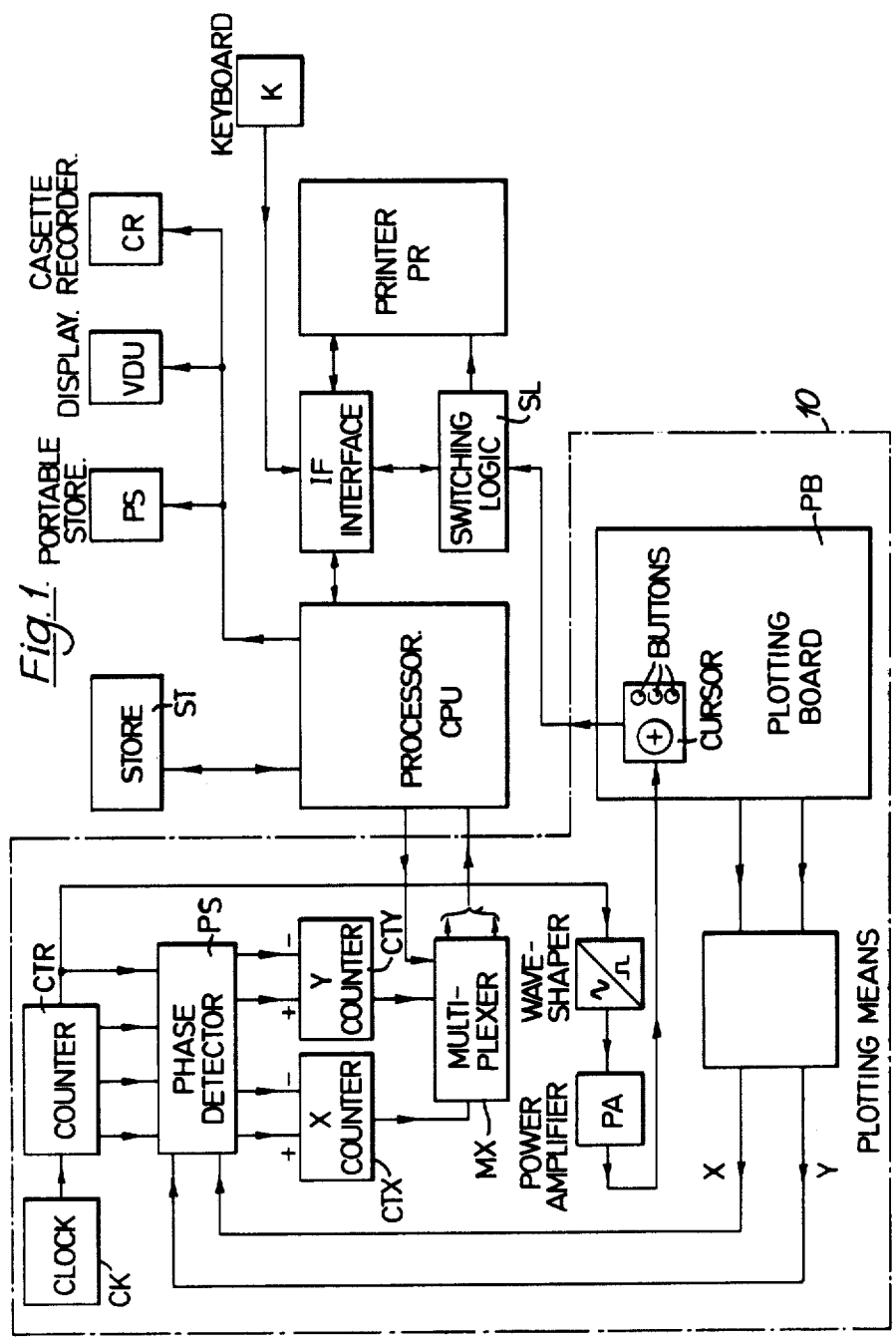

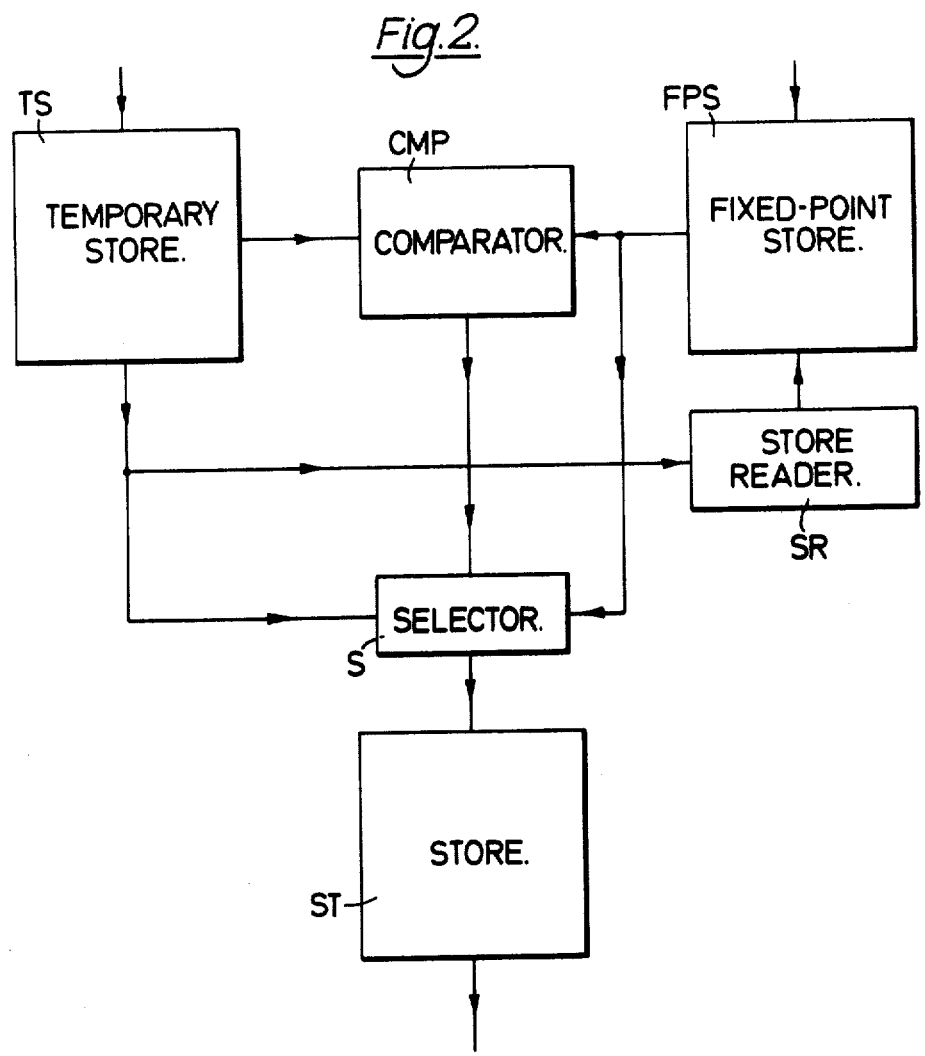

DATA PROCESSING SYSTEM FOR PRE-PLANNING THE FLIGHT OF AN AIRCRAFT

This is a continuation of copending application Ser. No. 031,670, filed Apr. 19, 1979, now abandoned, which is in turn a continuation of then copending application Ser. No. 878,796, filed Feb. 17, 1978, now abandoned.

This invention relates to data processing systems for pre-planning the flight of an aircraft from information on a chart and known parameters relating to the aircraft.

The planning of routes, for aircraft is commonly done to ensure that the aircraft follows a preset path to take advantage of, or to avoid, certain specified features. For example, an aircraft may be required to follow specified airways, turning at identified points. The route planning may be done whilst the aircraft is in flight, or, preferably, it may be preplanned to reduce the workload in the crew during the flight.

It is an object of the invention to provide a data processing system operable to provide an aircraft flight plan prior to the start of the flight.

According to the present invention there is provided a data processing system for planning routes from information carried on a chart, which system includes plotting board such as a coordinate digitizer tablet for determining relative position coordinates (e.g. X and Y coordinates) of each selected point on a chart and for outputting signals indicating the position coordinates of each of a number of selected points on a route; an input device for deriving further signals defining known parameters such as speed, fuel consumption, fuel load and bank angle relating to an aircraft intended to traverse the route; a calculating device responsive to said position signals and to said further signals defining known parameters to calculate predetermined variable factors, such as the bearing between two points, fuel consumption, and time of flight relating to the route between the selected points; and a recording device for providing a record of said variable factors for use when the aircraft follows said route.

Preferably the plotting board for determining relative position coordinates comprises a plotting table having a surface to which the chart is secured. The calculating device may be operable to accept charts of different scales or projections.

An embodiment of the invention will now be described with reference to the accompanying drawings, in which:

FIG. 1 shows a block schematic diagram of a data processing system in accordance with the invention; and FIG. 2 illustrates a modification to the system of FIG. 1.

Referring now to FIG. 1, the system is based on a plotting board PB and its associated circuitry, indicated generally by the reference 10. The plotting board consists of a surface to which a map or chart may be secured and under which are two sets of conductors. Each set comprises a large number of parallel conductors arranged as two inter-leaved arrays, one set being parallel to the X axis and the other set parallel to the Y axis of the board. A cursor C is movable over the surface of the board and carries a coil energisable by a sinusoidal waveform of constant amplitude so as to produce a symmetrical magnetic field. The cursor also carries a cross-wire which is accurately positioned in the centre of this field. The alternating current supply for the cursor is derived from a clock generator CK through a counter CTR, which for this purpose acts as a frequency divider. The square-wave output from the counter is converted to a sine wave, and a power amplifier PA produces the drive current for the cursor coil. The outputs from the two sets of X conductors and the two sets of Y conductors on the plotting board are fed through circuitry which produces signals representing the X and Y outputs. These signals are applied to a phase detector PD which compares the phases of the X and Y signals with the original square-wave used to drive the cursor, and produces pulses for each increment of movement of the cursor. These increments are used to increase or decrease the contents of separate X and Y counters CTX and CTY respectively to obtain the X and Y coordinates of the cursor at any instant.

The circuitry described above is well known and frequently used with plotting boards for digitising drawings and the like. U.S. Pat. Nos. 3,647,963 and 3,801,733 disclose arrangements of this type.

The X and Y counter outputs are multiplexed when required by a multiplexer MX, and applied as a 16-bit number to a processor CPU having an associated store ST. An interface IF interconnects the processor and a printer PR which may have an associated keyboard to act as an input device. Switching logic SL converts signals from a number of push buttons B carried on the cursor C to signals for controlling the printer and the processor, the latter via the interface IF. A keyboard K is connected to the interface IF.

The final elements of the system are optional peripheral output devices such as a portable, that is removable, store PS, a visual display unit VDU or a cassette recorder CR. The details of these various system elements and the manner in which they are interconnected are conventional.

In operation, for initilization and calibration, first a chart or map is placed on the plotting board and the cursor is set to a known datum position. The coordinates of this datum are typed in via the keyboard of the printer, either in map grid form or in terms of latitude and longitude. A second known datum, having different X and Y coordinates, is fed in similarly. The distance between points each defined in terms of X and Y coordinates can be calculated by the processor using Pythagorus' theorem. With this information, the processor is able to determine the scale of the map or chart in use. In addition, the processor is able to allow for any misalignment between the plotting board grid and that of the map or chart. In the general operation of the system, an aircraft may be assumed to travel in straight lines between selected points, and to travel at a more or less constant speed.

Considering the case of a route for an aircraft, it is a simple matter for the processor, having been supplied through the keyboard with known parameters such as speed, fuel consumption, fuel load and bank angle (or radius of turn), to determine variable factors such as the bearing between two points, fuel consumption (or fuel reserve), and time of flight. Such items as these are of great value to the pilot of the aircraft.

For example, by employing Pythagorus' theorem and conventional trigonometric identities, from the Cartesian map coordinate of two selected points along the route the equivalent polar coordinates representing the variable factor track heading may readily be calculated, as well as the distance between the points. Further, and as is set forth in the Katz et al U.S. Pat. No. 3,979,057, the basic equations relating time, distance, fuel consumption rate, and actual fuel consumption are well known. For example, Time=(Distance)/(Speed). (Fuel Consumption)=(Fuel Consumption Rate)×(Time). For more sophisticated calculations, the bank angle and ground speed may be combined to provide radius of turn, using the formula; (Radius of Turn)=(Ground speed)$^2$/(g tan $\theta$); where g is the gravitational constant and $\theta$ is the bank angle.

In operation, once the two datum points have been defined as above, the known parameters are identified and applied to the processor via the keyboard K of the printer. After this it is simply a case of defining each selected point along the route, when the processor will calculate and cause the printer to provide a record of the various variable factors relating to each leg of the route.

Provision may be made for changing the chart or map, two new datum points being defined each time this is done.

The drawing shows several optional output peripheral devices driven by the processor. The portable store PS is a store in which the calculated information may be stored so that it may subsequently be transferred to the aircraft's own data processing system. This relieves the crew of the necessity to feed all the parameters into the aircraft system themselves. Similarly a tape cassette may be used in the same way, the tape being obtained from a cassette recorder CR. The visual display unit VDU is an alternative to the printer for providing a visual output, though the printer provides a permanent record. It is, of course, possible to arrange for the display to appear only on the VDU, providing a printed record only when any corrections have been effected using the VDU display. The portable store PS and tape cassette may also be used as input devices to program the processor.

FIG. 2 illustrates one possible modification to the system described above. It may be that the various turning points along a route are in fact preselected and their coordinates stored in part of the store ST. It is desirable to use these preselected points rather than arbitrary points selected by the operator, if the two are sufficiently close together. The block diagram shows detail within the processor and store blocks of FIG. 1. A temporary store TS and a fixed-point store FPS are both connected to a comparator CMP. Both of these stores have separate inputs. The temporary store TS is also connected to a store reader SR which operates on the fixed point store FPS. The output of the comparator controls a selector S which passes data from either the temporary store or the fixed-point store to a further store WS containing the points to be used by the processor in the necessary calculation.

The comparator CMP operates to compare the coordinates of points presented to it from the two stores TS and FPS. If the two points are close enough, that is within a predetermined distance of one another, the preselected point from store FPS will be used; otherwise the point from the temporary store will take preference.

In operation, therefore, each point fed into the processor by the operator causes the store reader SR to read out one at a time from store FPS the coordinates of all points in that store. The comparator then checks each one to see if it is close enough to the point fed in by the operator. The output of the comparator controls the selector S to apply the appropriate coordinates to store WS to enable the subsequent calculations to be performed.

As already mentioned the processor may be arranged to cater for chart scale changing or misalignment, and is able if necessary to convert coordinates between map grid and latitude/longitude values. The plotting board need not use the free cursor and inductive field system described above. Other plotting boards use transducers to measure movement along the two perpendicular axes of the board. Similarly, scanning techniques could be used with the aid of a light pen, as described in our U.S. Pat. No. 4,022,969.

What we claim is:

1. A data processing system for pre-planning the flight of an aircraft travelling along straight tracks between successive ones of a number of known selected turning points represented on a chart, which system includes a plotting board having a surface for receiving the chart, said plotting board including means for determining relative digital position coordinates of each selected turning point on said surface with respect to one another and to output signals indicating the relative digital position coordinates of each of the selected turning points, input means for deriving further signals defining at least one known parameter from the group comprising ground speed, bank angle, initial fuel load, and fuel consumption rate, calculating means responsive to the signals from the plotting means and to the further signals from the input means to calculate for each track between a pair of selected turning points at least one variable factor from the group comprising track heading, fuel remaining, expected time for the track between the pair of selected turning points and including means for calculating the expected total flight time using the individual expected time calculations arrived at for the plurality of tracks, and record means for providing a record of the parameters and the variable factors necessary to enable the aircraft to cover the planned route.

2. A system as claimed in claim 1 in which the input means comprise a keyboard.

3. A system as claimed in claim 1 in which the means for providing a record include a type printer.

4. A system as claimed in claim 1 in which the means for providing a record include a data store.

5. A system as claimed in claim 4 in which the data store includes means for recording on magnetic tape.

6. A system as claimed in claim 1 in which the calculating means includes a store arranged to receive the relative digital position coordinates of the selected turning points and a processor arranged to calculate the variable factors from the digital position coordinates and the known parameters.

7. A system as claimed in claim 6 in which the calculating means includes a further store arranged to store the relative position coordinates of a predetermined number of said turning points, and in which the calculating means includes a comparator arranged to compare the positions of each selected turning point with the positions of the predetermined number of turning points and to apply to the processor the position of any said predetermined turning point if it lies within a predetermined distance of a selected turning point.

* * * * *